United States Patent [19]

Gentry

[11] 4,375,409
[45] Mar. 1, 1983

[54] FILTRATION APPARATUS

[76] Inventor: Glenn A. Gentry, 216 Ashcot Cir., Jackson, Miss. 39211

[21] Appl. No.: 27,947

[22] Filed: Apr. 6, 1979

[51] Int. Cl.³ ............................................. B01D 35/02
[52] U.S. Cl. .................................... 210/232; 210/241; 210/244; 210/446; 210/472; 210/477
[58] Field of Search ................... 53/97, 101, 104–107; 73/61 R; 210/232, 241, 244, 406, 416 R, 445, 446, 451, 455, 472, 477, 480

[56] References Cited

U.S. PATENT DOCUMENTS

| | | | |
|---|---|---|---|
| 425,025 | 4/1890 | Dennes et al. | 210/241 |
| 2,205,290 | 6/1940 | Herrera | 210/416 R X |
| 2,343,113 | 2/1944 | Jones | 210/445 X |
| 2,449,238 | 9/1948 | Lightfoot, Jr. | 210/445 X |
| 2,714,349 | 8/1955 | Johnston | 210/416 R X |
| 2,874,843 | 2/1959 | Townsend | 210/120 |
| 2,896,787 | 7/1959 | Roman | 210/406 |
| 3,055,208 | 9/1962 | Gallus | 210/416 R X |
| 3,063,289 | 11/1962 | Moul | 73/61 R |
| 3,393,491 | 7/1968 | Burton et al. | 53/101 |
| 3,401,802 | 9/1968 | Fann | 210/455 X |
| 3,463,322 | 8/1969 | Gerarde | 210/455 |
| 3,469,369 | 9/1969 | Helmke | 210/406 X |
| 3,493,496 | 2/1970 | Bray et al. | 210/116 X |
| 3,540,857 | 11/1970 | Martin | 210/416 R X |
| 3,565,256 | 2/1971 | Loeffler | 210/477 X |
| 3,782,175 | 1/1974 | Roman | 73/61 R |
| 3,893,920 | 7/1975 | Hubbard et al. | 210/197 |

FOREIGN PATENT DOCUMENTS

| | | | |
|---|---|---|---|
| 1432143 | 3/1969 | Fed. Rep. of Germany | 53/106 |
| 1013066 | 7/1952 | France | 53/105 X |
| 558686 | 5/1977 | U.S.S.R. | 210/451 |

*Primary Examiner*—Robert H. Spitzer
*Attorney, Agent, or Firm*—William D. Stokes

[57] ABSTRACT

Filtration apparatus utilizing gas pressure to drive a liquid to be filtered having a housing, a two-chambered filter cannister and a cannister sealing assembly mounted in the housing and connected with a source of gas under pressure in such manner that both filtration and sealing operations are carried out under a substantially equal head of pressure.

13 Claims, 6 Drawing Figures

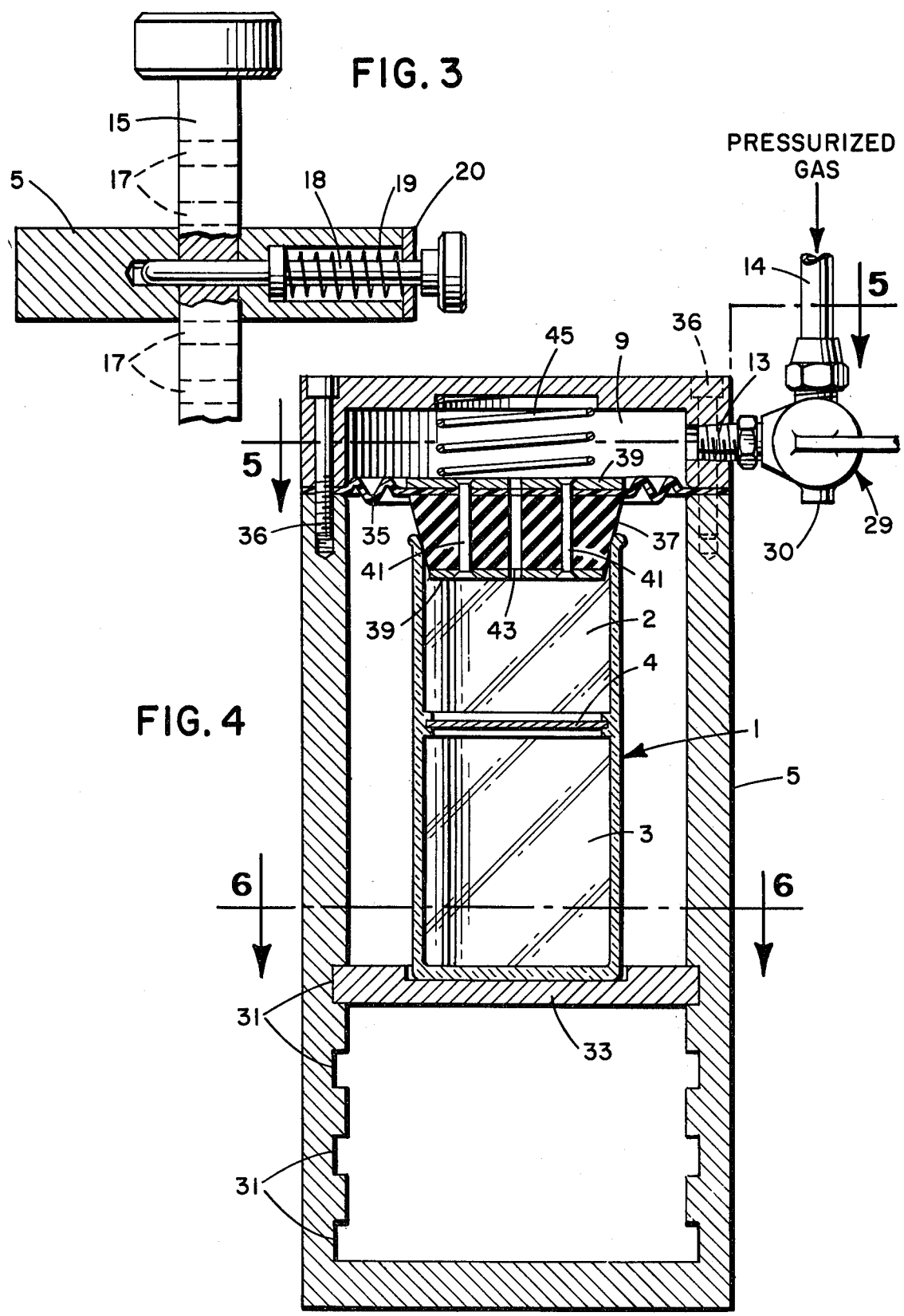

FILTRATION APPARATUS

BACKGROUND OF THE INVENTION

The invention is concerned with a pressure filtration apparatus in which pressurized gas is utilized to both seal the filtration unit and to drive the material to be filtered through a filter in the filtration unit.

Various types of pressure filtration systems are well-known in the prior art. Systems such as disclosed, for example, in U.S. Pat. No. 3,893,920 employ a cannister having two chambers separated by a permeable membrane or filter. In these systems, a fluid to be filtered is placed in one chamber and a source of negative pressure is applied to the other chamber to draw the liquid through the filter. These devices have many disadvantages, notably that in order to obtain a tight seal between the vacuum source and the filtration container, it is necessary to manipulate the vacuum connection of the filter unit and thus to expose it and its contents to the possibility of contamination. Other major disadvantages of the prior art devices include slowness of filtration and foaming of the filtrate. Another important disadvantage of the negative pressure devices of the prior art resides in the fact that if it is desired to eliminate the above disadvantages by using them as positive pressure devices, the sealing means for the filtration chamber is subjected to pressures which tend to push the sealing means out of the upper chamber. To compensate, extraordinary pressure must be used to seal the unit which causes jammed sealing means after completion of a filtering operation.

Positive pressure filtration devices are also known in the art, for example, U.S. Pat. No. 3,493,496 teaches an impermeable, flexible diaphragm which transmits pressure from a driving gas or fluid to the liquid to be filtered. A mechanical piston is disclosed in U.S. Pat. No. 3,565,256 to communicate pressure from a driving gas (Freon) to the liquid. While it is also known in the art that generally faster filtration rates, with less foaming of fluids, may be accomplished with positive pressure filtration devices, one of the major difficulties to successful filtration-using positive pressure has been the inability to obtain a tight and easily releasable seal of the filtration cannister while avoiding contamination of the material to be filtered. One of the proposed sealing methods is disclosed, for example, in U.S. Pat. No. 3,540,857 wherein a ram or piston pushes the filtration cannister into sealing contact with an anvil having a central opening. The pressure applied by the piston is mechanical and is maintained at a preset value. Unfortunately, in such devices, if the positive pressure supplied to the fluid contained in the filtration cannister should, even momentarily, exceed the preset sealing pressure applied by the piston, the seal will be broken. On the other hand, if the seal is not prematurely broken, such seals have proven difficult to release after filtration.

Various types of sealing arrangements for negative pressure filtration systems are also well-known in the art. In U.S. Pat. No. 2,874,843 a negative pressure is applied to a filtrate receptacle to cause a downward force to seal a filter unit to the receptacle. U.S. Pat. Nos. 2,896,787 and 3,782,175 disclose sealing arrangements wherein an apertured, circular piece of rubber or a plastic ring overlay a filter. A vacuum applied to a filtrate receptacle draws the rubber or ring down over the filter, thus sealing the filter. U.S. Pat. No. 3,063,289 discloses a sealing arrangement wherein a rubber stopper having a central aperture is disposed between a filtrate receptacle and a filter chamber. A source of negative pressure seals the stopper within the filtrate receptacle and draws a fluid through a filter disposed in the filter chamber. However, such sealing arrangements are prone to jamming and require specially designed filtration units.

SUMMARY OF THE INVENTION

The disadvantages of prior art devices are overcome by the present invention wherein there is provided positive pressure filtration apparatus utilizing pressurized gas to create a differential between the force to drive the liquid to be filtered through a filter and the force required to provide a seal between the source of gas or fluid and the cannister while maintaining the pressure of the gas on the liquid and sealing means substantially equal. More specifically, the apparatus of the invention comprises a filtration unit having an upper material receiving chamber, a filter and a lower filtrate receiving chamber mounted in a housing which includes means to adjustably support the filtration unit in an upright position. Also mounted in the housing is closure means for releasably sealing the filtration unit. A source of substantially equal gas pressure is provided to drive the material to be filtered and be operatively connected with the sealing assembly in such manner as to provide a positive sealing of the closure element when the device is in operation. The inventive apparatus is constructed in such manner that the force operating on the closure element is always greater than the back force generated on the closure element within the filtration unit by the gas introduced into the unit to drive the material to be filtered.

In one preferred embodiment, the apparatus comprises a housing, a two-chamber filtration unit, a sealing assembly comprising a vertically movable piston element mounted within the housing and a source of compressed gas. The filtration unit has an open upper chamber for receiving a liquid to be filtered, a filter element, and a closed lower chamber for receiving the filtrate. The filtration unit is supported on the piston element and movable therewith. A sealing assembly or closure means having a gas communicating passageway formed therein, is mounted in the cabinet and is adapted to sealingly engage the upper chamber of the filter cannister when the apparatus is in operation. A source of compressed gas is connected to the piston drive means and through the closure means into the filter unit. In operation, the piston element rises and brings about a positive seal of the closure element and simultaneously the gas under pressure is flowing into the filter unit driving the material to be filtered through the filter.

In another embodiment, it is contemplated that the filter cannister rests on an adjustable support mounted within the housing. A diaphragm is provided which expands responsively to gas introduced under pressure into a chamber within the housing. The closure element having an opening therethrough communicating with the interior of the filtration unit is mounted on the diaphragm element in such manner that when the diaphragm expands the closure element is driven into sealing relationship with the filtration unit while simultaneously the compressed gas causing expansion of the diaphragm flows through the opening into the filtration unit driving the material through the filter.

The present invention has several distinct advantages over prior art pressure filtration devices, among which is the provision of a simple, practical and relatively inexpensive apparatus which enables fast filtration without the attendant disadvantages of the prior known devices such as foaming, contamination, complexity of operation and safety. The construction of the inventive apparatus substantially eliminates any mechanical stress on the filtration unit, leakage and/or ejection of the closure during a filtration operation. These and other objects, features and advantages will become obvious from the more detailed description of the invention set forth hereinafter with reference to preferred embodiments of the invention as illustrated in the accompanying drawings.

BRIEF DESCRIPTION OF THE DRAWINGS

FIG. 3 is a view partly in section of the locking device used with the adjustable closure rod of FIG. 1;

FIG. 4 is a cross-sectional view of another embodiment of the invention wherein a diaphragm-carried closure means is used;

DESCRIPTION OF THE PREFERRED EMBODIMENTS

Figure 1:
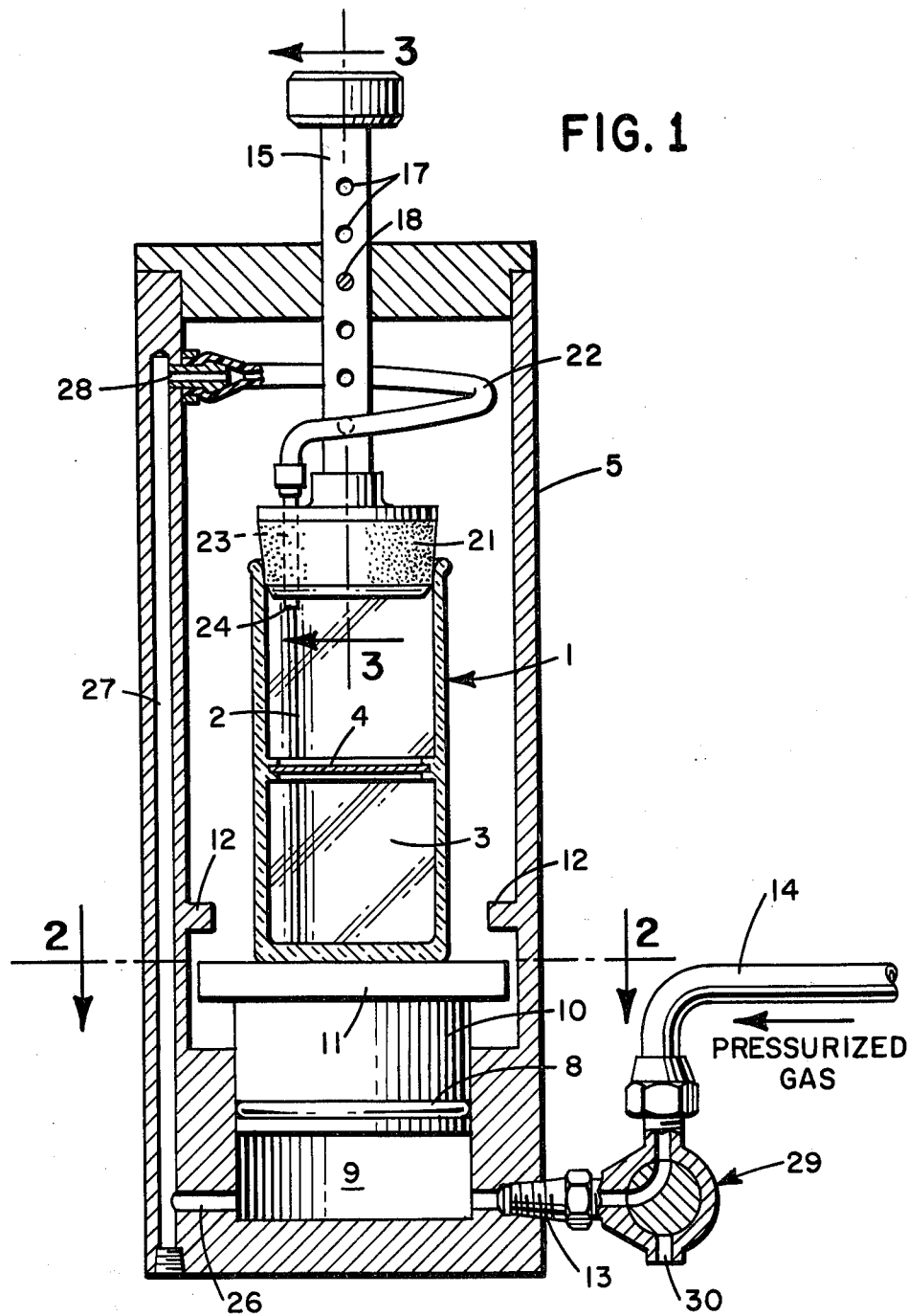
FIG. 1 is a view partly in section of the filtration apparatus of the invention.
Figure 2:
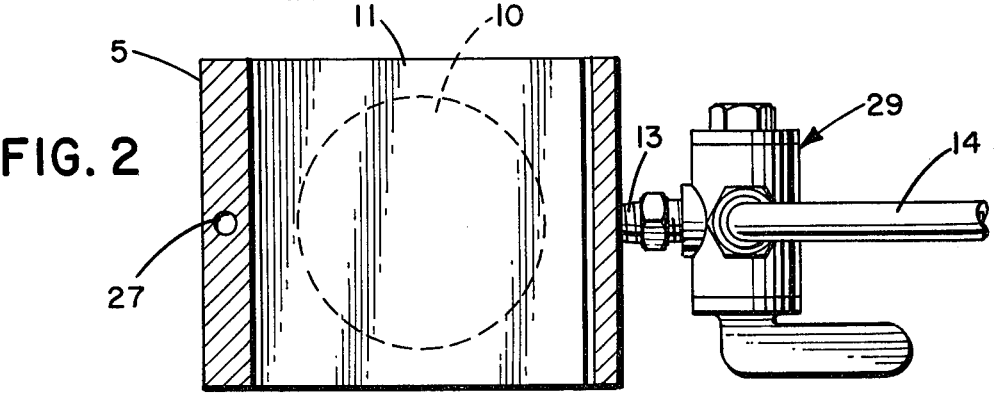
FIG. 2 is a cross-sectional view partly in section of FIG. 1 taken along lines 2—2.

Referring to the drawings in which like parts are designated by the same numeral, reference is made specifically to FIGS. 1, 2 and 3. In this embodiment of the invention, a generally cylindrically shaped filtration unit 1 is shown having an upper chamber 2 and a lower chamber 3 separated by a filter element 4. Liquid to be filtered or sterilized is placed in upper chamber 2 through an opening in the top of the chamber. Gas pressure is applied to the surface of the material to be filtered, disposes in the liquid through filter 4 into the lower filtrate receiving chamber 3. Bacteria, fungi, microorganisms, and various types of sediment are trapped on the filter. Filtration unit 1 is mounted within a generally rectangular housing 5. Housing 5 may be formed from any suitable material such as wood, metals or plastic. Disposed in the bottom of cabinet 5 is a gas expansion chamber 9. For simplicity of description, expansion chamber 9 will be referred to as a piston chamber. In the illustrated embodiment, piston chamber 9 is molded as an integral part of cabinet 5. A piston element 10 is slidingly mounted and sealingly engaged in pressure chamber 9 by means of piston ring or gasket 8. Mounted on piston element 10 is a support 11 on which filtration unit 1 is mounted. As shown in the illustrated embodiment, stop members 12 are provided on the interior walls of housing 5 to limit the upward movement of the support 11 and piston 10.

As specifically illustrated in FIGS. 1 and 2, a valve assembly 29 is mounted on housing 5 and connected to a source of compressed gas (not shown) through tubing or hose 14. The source of compressed gas may, for instance, be bottled gas under pressure or gas supplied by a conventional compressor. The rate of gas flow and pressure may be controlled by any of the well-known conventional adjustable pressure regulator devices (not shown). Gas under pressure is supplied to the piston chamber 9 through conduit 13 controlled by valve assembly 29.

Referring particularly to FIGS. 1 and 3, the top of housing 5 is provided with an opening through which a vertically adjustable rod 15 having a plurality of openings deposed along its length, is slidably journaled. A spring loaded locking pin assembly 18 mounted on housing 5 is provided to allow a variable height adjustment for rod 15. Pin mechanism 18 is mounted in housing 5 through an opening (not numbered) and held in place by a spring means 19 and retaining plate 20.

Mounted on the lower end of rod member 15 is filtration unit sealing or closure means 21. While closure member 21 may be of any type of material or shape adapted to seal the filtration unit, a rubber stopper has been found to be quite satisfactory. An opening 23 is provided in closure 21 through which a tube element 24 is inserted into chamber 2 of the filtration unit. The other end of tube 24 is connected via a flexible hose or tubing 22 and gas conduits 27 and 26 to piston chamber 9. Flexible tubing 22 is of such length as to not restrict the upward and downward movement of filtration unit 1 mounted on piston 10. In the illustrated embodiment of FIG. 1, hose 22 is connected with conduit 27 through a connector 28.

Piston chamber 9, as discussed hereinbefore, receives gas under pressure from conduit 13. A gasket or piston ring 8 is provided to effect sliding and sealing engagement between piston 10 and the walls of chamber 9. Gas under pressure flowing into chamber 9 is also delivered through conduits 26, 27, tubing 22 and tube 23 into chamber 2 of filtration unit 1. When it is desired to exhaust the gas from the system after a filtration operation, gas valve 29 is simply turned to the off position allowing the gas within the system to flow out exhaust port 30.

It will be readily apparent to those skilled in the art that conduit 27, instead of being molded as a part of housing 5, may be simply a hose connecting tubes 26 and 28 through suitable connections.

In operation, pin mechanism 18 is withdrawn from engagement with holes 17 of rod 15. Rod 15 is raised and a filtration unit 1 containing liquid in chamber 2 to be filtered is placed on support 11. Rod 15 is lowered until cannister closure member 21 sealingly engages the mouth of cannister 1. Pin mechanism 18 is then lockingly engaged with the nearest opening 17 in rod 15 whereby closure 21 is rather loosely fixed in a closed position with respect to vertical displacement.

Stopcock assembly 29 is adjusted to allow gas under pressure to flow into piston cylinder 9. With the entrance of gas under pressure into piston chamber 9, piston 10 and support 11, upon which the filtration cannister 1 is seated, will rise, causing closure 21 to be firmly fixed into a sealing relationship with filtration unit 1. It will be appreciated that any loss of pressure due to the length and dimensions of interconnecting conduits and tubing between piston cylinder 9 and the filtration unit, will not greatly affect the rise of piston 10.

Concomitantly with the sealing engagement of closure 21 and filtration unit 1, the pressure on the liquid contained in upper chamber 2 and the pressure on the surfaces of piston 10 in piston chamber 9 will be equal. Upward movement of piston 10, support 11 and filtration unit 1 will cease when the filtration unit becomes firmly and sealingly engaged with closure 21 against the downward thrust of rod 15 on which closure 21 is mounted is locked into place as explained above. The gas pressure on the liquid in chamber 2 drives the liquid to be sterilized or filtered through filter 4 into chamber 3. In order to establish the necessary sealing force, the surface area of piston 10 differential in this embodiment subjected to upward pressure of the gas is larger than the surface area of closure member 21 subjected to the upward thrust of the gas within chamber 2 thereby providing a simple and efficient means to insure the maintenance of a tight seal between closure member 21 and filtration unit 1. It will be seen that even when differential force holding stopper 21 in place is slight at moderate gas pressures, it is sufficient under the conditions of that specific operation to make and maintain the seal. Such a differential force sealing arrangement provides a tremendous advantage over prior art devices using purely mechanical seals since the upward sealing force of piston 10 will always be greater than the fluid driving force in chamber 2 which would tend to unseat the stopper 21 thereby preventing leakage and/or contamination. It will also be recognized that little mechanical stress is placed on the filtration unit 1 since it is only the net or differential force on stopper 21 which is used to seal it to the filtration unit. The present invention is readily adaptable for use under high pressures and correspondingly faster filtration rates since the sealing force on stopper 21 is always positive and is adjusted automatically through the force differential between piston 10 and closure 21.

After filtration is completed, the stopcock 29 is adjusted so that the gases in the system are vented to the outside. The reduction of the gas pressure in the system causes lowering of the filtration unit consequently causing closure member 21 to become unsealed.

Figure 5:
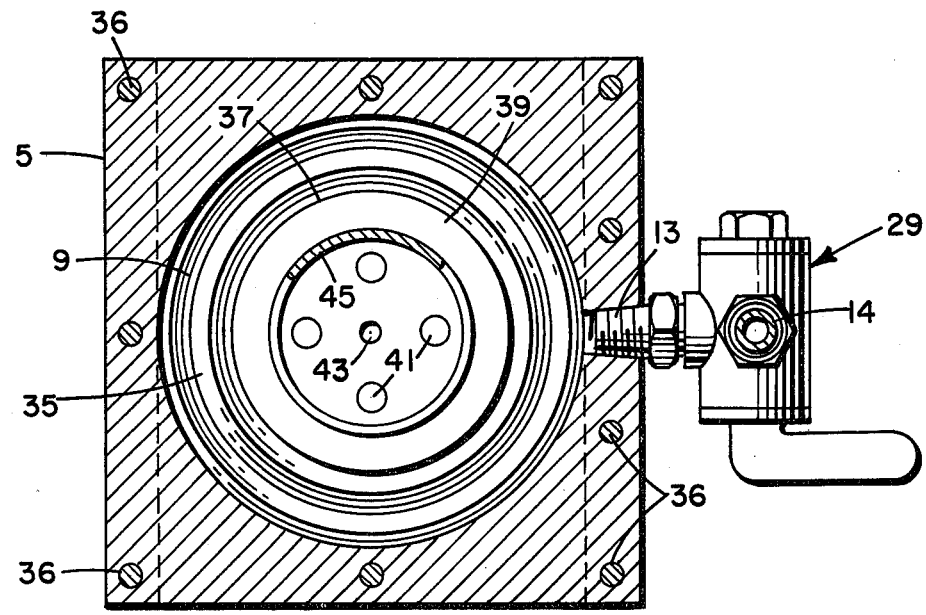
FIG. 5 is a cross-sectional view taken on lines 5—5 of FIG. 4.
Figure 6:
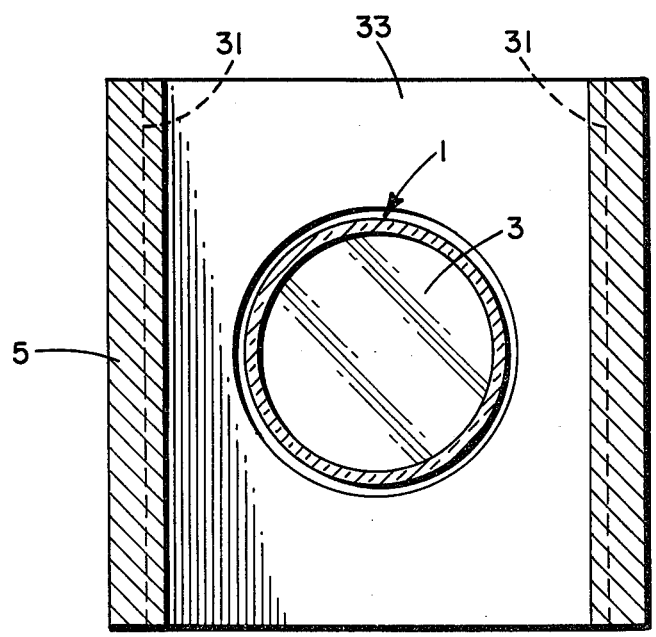
FIG. 6 is a cross-sectional view of FIG. 4 taken along lines 6—6.

As described with respect to the embodiment depicted in FIG. 1, the embodiment in FIGS. 4, 5 and 6 comprises a filtration unit 1 divided into an upper chamber 2 for the filtrand and lower filtrate chamber 3 the two chambers being separated by filter means 4. In this embodiment, housing 5 is provided with longitudinally deposed slots 31 for the mounting or insertion of a support shelf 33 for the filtration unit 1. A plurality of slots 31 are provided to place the support at various levels to accommodate filtration cannisters of various heights. The filtration unit 1 remains stationary in this embodiment. In other words, adjustable support 33 serves the same function as the vertically adjustable rod device 15 of FIG. 1 while also providing support for the filtration cannister. A gas expansion chamber 9 is provided at the top of housing 5 and instead of a piston member responsive to air under pressure in the chamber, a flexible diaphragm member 35 is provided. In the illustrated embodiment, diaphragm member 35 is shown mounted in housing 5 by means of attachment screws 36. Integrally mounted on diaphragm 35 is filtration unit closure member 37. Closure 37 is shown mounted to diaphragm 35 by means of a pair of sandwiching plates 39 held together by bolts 41 extending through the diaphragm and closure member. A gas passageway 43 in closure 37 is provided between gas chamber 9 and upper chamber 2.

As described with reference to FIG. 1, a gas valve assembly 29 is mounted on the exterior of housing 5 and connected to gas pressure chamber 9 through conduit 13 and to a source of compressed gas (not shown) through conduit 14 and suitable pressure regulators (not shown). Expansion chamber 9 may further include a spring member 45 disposed between the top of the chamber and the upper of the sandwich plates 39 to bias the diaphragm mounted closure member into a sealing engagement with the filtration unit prior to increasing the pressure in the expansion chamber.

In the operation, a filtration unit having therein a material to be filtered or sterilized is placed in the cabinet in such manner that the closure member 37 is loosely seated in the opening into chamber 2. Shelf member 33 is then slid into the proper pair of slots 31 which will support the cannister and firmly hold the same in operative relationship to closure member 37 (the plurality of slots 31, like the plurality of holes 17 in the first embodiment, allows the use of canisters of different heights.) Stopcock 29 is opened to allow gas under pressure to enter the expansion chamber. The gas under pressure entering the expansion chamber simultaneously flows into the upper chamber 2 exerting pressure on the surface of the liquid to be filtered while exerting pressure on closure member 37 and diaphragm 35 causing the closure member to be firmly and sealingly held in place against any back pressure exert by the gas within the filtration chamber. After the liquid has been filtered into the lower chamber 3, the pressure within chamber 9 hence the filtration unit may be released gradually by slowly turning stopcock 29 to the exhaust position.

It will be apparent to those skilled in the art that the gas pressure utilized in any filtration operation of the device depends solely on the quantity and physical characteristics of the material to be filtered, for example, viscosity and temperature. It will also be appreciated that the inventive device provides a simple and practical means for insuring that the downward pressure holding the closure means in a sealing relationship to the filtration cannister is greater than the back pressure exerted by the gas introduced into the filtration cannister. It will also be appreciated that the inventive filtration device provides means whereby minimal handling is required for any filtration operation to avoid or eliminate contamination. It will also be appreciated that filter canisters useful in the embodiments of this invention may be obtained in the trade pre-sterile and sealed in a protective plastic bag. When such devices have been used in the past, negative pressure systems require that before the vacuum source is connected, the plastic protective bag must be removed from the canister, thus exposing any ports or orifices (through which the sterile filtrate must be withdrawn) to contamination. In the proposed invention it is necessary to open only the top of the bag—the bottom may be secured by a rubber band or sealed separately by the manufacturer—prior to filtration.

While the pressure filtration apparatus of the present invention has been described in considerable detail, it is understood that various changes and modifications may occur to persons of ordinary skill in the art without departing from the spirit and scope of the invention as is defined in the appended claims.

What is claimed is:

1. Filtration apparatus comprising housing means; a filtration unit having an upper material receiving chamber, a filter, and a lower filtrate receiving chamber,
   adjustable support means disposed within said housing to support said filtration unit in an upright position;
   closure means mounted within said housing for sealing said filtration unit;

gas pressure generating means comprising means to supply gas under pressure into the upper chamber of said filtration unit to drive the material to be filtered through the filter into the filtrate receiving chamber and means to create a gas pressured sealing force on said closure means greater than the back force generated within the filtration unit on said closure means by the gas introduced into the filtration unit.

2. The filtration apparatus of claim 1 wherein said means to create a sealing pressure on said closure means includes a piston means mounted in said housing and filtration unit support means mounted on said piston means, said piston means and support means adapted to be vertically moved and to hold said filtration unit in sealing engagement with said closure means responsive to gas under pressure.

3. The filtration apparatus of claim 1 wherein said apparatus includes means connected with said housing and said closure means to align and place said closure means in a sealing relationship with said filtration unit.

4. The apparatus of claim 3 wherein said means connected with said housing comprise a spring member mounted within the housing and biased against said closure means.

5. The filtration apparatus of claim 1 wherein the surface of said closure means exterior to said filtration unit has a greater area than the surface of said closure exposed to the interior of said filtration unit.

6. The apparatus of claim 1 wherein said filtration unit is removable.

7. Filtration apparatus comprising housing means; a filtration unit having an upper material receiving chamber, a filter, and a lower filtrate receiving chamber,
adjustable support means disposed within said housing to support said filtration unit in an upright position;
closure means mounted within said housing for sealing said filtration unit;
means connected with said housing means and said closure means to align and place said closure means in a sealing relationship with the filtration unit, said means comprising a rod member having one end mounted on said closure means mounted through the top of said housing and locking means to lock said rod in vertical adjustment;
pressure generating means comprising means to supply gas under pressure into the upper chamber of said filtration unit to drive the material to be filtered through the filter into the filtrate receiving chamber; and
means to create a sealing force on said closure means greater than the back force generated within the filtration unit on said closure means by the gas introduced into the filtration unit.

8. Filtration apparatus comprising housing means; said housing means including a chamber for receiving a gas under pressure; a filtration unit having an upper material receiving chamber, a filter, and a lower filtrate receiving chamber,
adjustable support means disposed within said housing to support said filtration unit in an upright position;
a diaphragm member mounted in said housing responsive to a gas under pressure;
closure means mounted on said diaphragm for sealing said filtration unit;
pressure generating means comprising means to supply gas under pressure into the upper chamber of said filtration unit to drive the material to be filtered through the filter into the filtrate receiving chamber; and
means to create a sealing force on said closure means greater than the back force generated within the filtration unit on said closure means by the gas introduced into the filtration unit.

9. Filtration apparatus comprising housing means; a filtration unit having an upper material receiving chamber,
adjustable support means disposed within said housing to support said filtration unit in an upright position;
closure means mounted within said housing for sealing said filtration unit;
pressure generating means comprising means to supply gas under pressure into the upper chamber of said filtration unit to drive the material to be filtered through the filter into the filtrate receiving chamber;
means including a piston means to create a sealing force on said closure means greater than the back force generated within the filtration unit on said closure means by the gas introduced into the filtration unit, said piston means being connected with said gas pressure means; and
said adjustable support means being mounted on said piston means, whereby said support means moves and holds said filtration unit in sealing engagement with said closure means in response to gas under pressure.

10. Filtration apparatus comprising a housing; a filtration unit having an upper material receiving chamber, a filter, and a lower filtrate receiving chamber;
means for supplying gas under pressure;
a gas activated piston assembly including a piston chamber and a piston member slidingly movable within said chamber, said piston member providing support for said filtration unit and said piston chamber being connected to said gas supply means and movingly responsive to gas under pressure;
a closure assembly mounted within said housing, said assembly having a closure member and means connected with said housing and said closure member to align and lock said closure member into a sealing relationship with said filtration unit;
an opening in said closure member communicating with the interior of said filtration unit and connected with said piston chamber whereby the gas under pressure flowing into said piston chamber also flows into said filtration unit to drive the material to be filtered through the filter;
said piston surface area exposed to the gas under pressure in the piston chamber being greater than the surface area of the closure member exposed to the back pressure generated within the filtration unit by the gas under pressure introduced into the filtration unit to cause a net upward differential force on said piston to urge said filtration unit into positive sealing engagement with said closure means.

11. Filtration apparatus comprising:
a housing;
a filtration unit having an upper material receiving chamber, a filter, and a lower filtrate receiving chamber;

adjustable supporting means disposed within said housing to support said filtration unit in an upright position;

means for supplying gas under pressure;

closure means for sealing said filtration unit, said closure means having an opening therethrough for the passage of gas under pressure into said filtration unit;

a chamber within said housing for receiving gas under pressure;

a diaphragm mounted in said chamber responsive to gas under pressure in said chamber, said closure means being mounted on said diaphragm in such manner whereby expansion of said diaphragm by gas pressure seats said closure means in a sealing relationship with said filtration unit and release of said pressure unseals said closure means and the area of said diaphragm and closure surface exposed to the gas under pressure being greater than the surface area of the closure member exposed to the back pressure generated by the gas under pressure within the filtration unit.

12. The filtration apparatus of claim 11 wherein said adjustable supporting means comprise a shelf and a plurality of grooves formed within said housing to receive edges of said shelf.

13. The filtration apparatus of claim 11 wherein said chamber in said housing for receiving gas under pressure further includes a spring member disposed between said closure means and a wall of said chamber to align and bias said closure means into a sealing engagement with said filtration unit.

* * * * *